Aug. 3, 1965  D. A. JOHNSON ETAL  3,198,804
α-AMINOMETHYLPENICILLIN DERIVATIVES
Filed Jan. 6, 1965  4 Sheets-Sheet 1

FIGURE 1
INFRA-RED ABSORPTION SPECTRUM OF HETACILLIN

DAVID A. JOHNSON
CHARLES A. PANETTA
*INVENTOR.*

BY CURTIS W. CARLSON
RICHARD H. BRINK
ROBERT B. SIMONTON
HERBERT W. TAYLOR JR.

United States Patent Office 3,198,804
Patented Aug. 3, 1965

3,198,804
α-AMINOMETHYLPENICILLIN DERIVATIVES
David A. Johnson, Fayetteville, and Charles A. Panetta, East Syracuse, N.Y., assignors to Bristol-Myers Company, New York, N.Y., a corporation of Delaware
Filed Jan. 6, 1965, Ser. No. 423,677
10 Claims. (Cl. 260—306.7)

This application is a continuation-in-part of our prior copending applications Serial No. 253,995, filed January 25, 1963, and now abandoned, Serial No. 329,270 filed December 9, 1963, and now abandoned, and Serial No. 381,808 filed July 10, 1964, and now abandoned.

This invention relates to new synthetic compounds of value as antibacterial agents, as nutritional supplements in animal feeds, as agents for the treatment of mastitis in cattle and as therapeutic agents in poultry and animals, including man, in the treatment of infectious diseases caused by gram-positive and gram-negative bacteria and, more particularly, relaties to derivatives of α-aminomethylpenicillins prepared by reaction with certain aldehydes and ketones, especially acetone.

Antibacterial agents such as benzylpenicillin have proved highly effective in the past in the therapy of infections due to gram-positive bacteria but few such agents are active also against gram-negative bacteria or are stable in aqueous acid, e.g. upon oral administration. The compounds of the present invention are particularly useful in that they possess potent antibacterial activity against both gram-negative and gram-positive bacteria. The compounds of the present invention are also stable in acidic medium and can be given by parenteral or oral administration and are easily isolated from the reaction mixture in which they are prepared.

There are provided according to the present invention compounds selected from the group consisting of amphoteric compounds having the structure wherein R is a member selected from the group consisting of hydrogen, alkyl having from 1 to 10 carbon atoms inclusive, cycloalkyl having from 5 to 7 carbon atoms inclusive, indolyl(lower)alkyl, naphthyl, benzyl, furyl, and radicals having the formulae and wherein $R^1$, $R^2$ and $R^3$ each represent a member selected from the group consisting of hydrogen, nitro, di(lower)alkylamino, (lower)alkanoylamino, (lower)alkanoyloxy, (lower) alkyl (including straight and branched chain saturated aliphatic groups having from 1 to 6 carbon atoms inclusive), (lower)alkoxy, sulfamyl, chloro, iodo, bromo, fluoro, trifluoromethyl, (lower)alkylthio, (lower)alkylsulfonyl, carbo(lower)alkoxy, benzyl, phenethyl, cycloheptyl, cyclo hexyl and cyclopentyl; wherein $R^5$ is a member selected from the group consisting of hydrogen and methyl; wherein $R^6$ is (lower)alkyl when $R^5$ is methyl and wherein, when $R^5$ is hydrogen, $R^6$ is a member selected from the group consisting of (lower)alkyl and radicals of the formula wherein $R^1$, $R^2$ and $R^3$ have the meaning set forth above and $n$ is an integer from 0 to 6 inclusive, and wherein $R^5$ and $R^6$ when taken together with the carbon atom to which they are attached represent cycloalkylidene having 4 to 7 carbon atoms inclusive; and the nontoxic pharmaceutically acceptable salts thereof.

There are further provided, according to the present invention, an amphoteric antibacterial compound and the nontoxic pharmaceutically acceptable salts thereof; said amphoteric antibacterial compound being prepared by the process which comprises mixing (a) an aminopenicillin selected from the group consisting of the acids of the formula wherein R has the meaning set forth above and the salts thereof; with at least an equimolar weight of (b) a carbonyl compound selected from the group consisting of cyclobutanone, cyclopentanone, cyclohexanone, cycloheptanone, methyl (lower)alkyl ketones and aldehydes of the formula $R^7CHO$ wherein $R^7$ is a member selected from the group consisting of (lower)alkyl and the radicals of the formula wherein $R^1$, $R^2$, $R^3$ and $n$ have the meaning set forth above (c) at a pH within the range of about pH 5.5 to about pH 9.5.

The nontoxic, pharmaceutically acceptable salts include, for example, (1) nontoxic pharmaceutically acceptable salts of the acidic carboxylic acid group such as the sodium, potassium, calcium, aluminum and ammonium salts and nontoxic substituted ammonium salts with amines such as tri(lower)alkylamines, procaine, dibenzylamine, N - benzyl - beta - phenethylamine 1-ephenamine, N,N'-dibenzylethylenediamine, dehydroabietylamine, N, N' - bis - dehydroabietylethylenediamine, N-(lower)alkylpiperidines, such as N-ethylpiperidine and other amines which have been used to form salts of benzylpenicillin; and (2) nontoxic pharmaceutically acceptable acid addition salts (i.e. salts of the basic nitrogen) such as (a) the mineral acid addition salts such as the hydrochloride, hydrobromide, hydroiodide, sulfate, sulfamate, sulfonate, phosphate, etc. and (b) the organic acid addition salts such as the maleate, acetate, citrate, tartrate, oxalate, succinate, benzoate, fumarate, malate, mandelate, ascorbate, β-naphthalene sulfonate, p-toluenesulfonate and the like. Also included are the easily hydrolyzed esters or amides of such acids which may be converted to the free acid form by chemical or enzymatic hydrolysis.

The term "(lower)alkyl" as used herein means both straight and branched chain aliphatic hydrocarbon radicals having from 1 to 6 carbon atoms such as methyl, ethyl, propyl, isopropyl, butyl, isobutyl, t-butyl, amyl, hexyl, etc. Similarly, where the term "(lower)" is used as part of the description of another group, e.g. (lower)- alkoxy, it refers to the alkyl portion of such group which is therefore as described above in connection with (lower)-alkyl.

To illustrate groups including (lower)alkyl groups, it is pointed out that (lower)alkoxy includes such radicals as methoxy, ethoxy, isopropoxy, etc.; (lower)alkylthio includes methylthio, ethylthio, butylthio, etc.; (lower)-alkanoyl includes acetyl, propionyl, butyryl, etc.; (lower)-alkylsulfonyl includes methylsulfonyl, ethylsulfonyl, hexylsulfonyl, etc.; di(lower)alkylamino includes dimethylamino, diethylamino, ethylmethylamino, etc.

The penicillin derivatives produced by the process of the present invention have the structure wherein R, $R^5$ and $R^6$ have the meaning set forth above and the exact connection of the single atoms of carbon, hydrogen, nitrogen and oxygen shown in the rectangle to each other and to the atoms with valences shown extending into the rectangle is not known except in the cases where $R^5$ and $R^6$ are each methyl or methylene.

These products each have one of the structures represented by the following three formulae:

and wherein R, $R^5$ and $R^6$ have the meaning set forth above.

In the cases where $R^5$ is —$CH_3$ and $R^6$ is (lower)alkyl the compounds have the following structure:

where R has the meaning set forth above and Alk represents (lower)alkyl, e.g. methyl.

When $R^5$ is hydrogen and $R^6$ is phenyl or substituted phenyl it is believed but not yet established that the compounds of the present invention have the structure where R has the meaning set forth above.

One preferred embodiment of the present invention is the compound designated hetacillin which has the structure

One preferred embodiment of the present invention is an amphoteric compound, designated hetacillin and having the formula said ampoteric compound being characterized when pure by the following properties:
(a) molecular formula, $C_{19}H_{23}N_3SO_4$;
(b) melting point in the range of about 180–191° C. with decomposition;
(c) specific rotation of about +266° in pH 7.0 buffer;
(d) isoelectric point of 2.5 determined by electrophoresis;
(e) antibacterial activity versus gram-positive and gram-negative bacteria;
(f) formation of a methyl ester of M.P. 101.5–102° C.; and
(g) infrared absorption maxima when pelleted in potassium bromide at the following wave numbers in reciprocal centimeters: 3440 (broad), 3255, 2980, 2960, 2940, 2480 (broad), 1800, 1727, 1501, 1465, 1410, 1392, 1380, 1375, 1360, 1290, 1268, 1242, 1205, 1175, 1150, 1132, 1075, 1068, (shoulder), 1024, 1012, 926, 910, 900, 876, 855, 840, 790, 770, 760, 705, 660, 625, 612, 555, 510, 495, 470.

Thus one preferred embodiment of the present invention is the antibacterial agent, designated hetacillin, which is prepared by the reaction of α-aminobenzyl-penicillin with at least one mole of acetone at a pH of from about 7.5 to about 9.5

Another preferred embodiment of the present invention is the compound which has the structure A preferred embodiment of the present invention is an amphoteric compound having the formula said amphoteric compound being characterized when pure by the following properties:
(a) molecular formula, $C_{17}H_{21}N_3S_2O_4$:
(b) melting point: darkness at 165–170° C., melts with decomposition at 195–200° C.;
(c) specific rotation of about +307° in 1% solution in dimethylformamide;
(d) isoelectric point of 2.5 determined by electrophoresis;
(e) antibacterial activity versus gram-positive and gram-negative bacteria;
(f) infrared absorption maxima when pelleted in potassium bromide at the following wave numbers in reciprocal centimeters: 3440 (broad), 3250, 3110, 3100, 2980, 2970, 2940, 2470 (broad), 1800, 1730, 1465, 1410, 1395, 1382, 1373, 1360, 1290, 1270, 1243, 1210, 1175, 1155, 1135, 1076, 1024, 1012, 913, 892, 877, 860, 840, 771, 760, 742, 722, 660, 554, 510, 493.

Thus a preferred embodiment of the present invention is the antibacterial agent which is prepared by the reaction of α-amino-2-thienylmethylpenicillin with at least one mole of acetone at pH of from about 7.5 to about 9.5.

Referring to the drawings.

Figure 1:
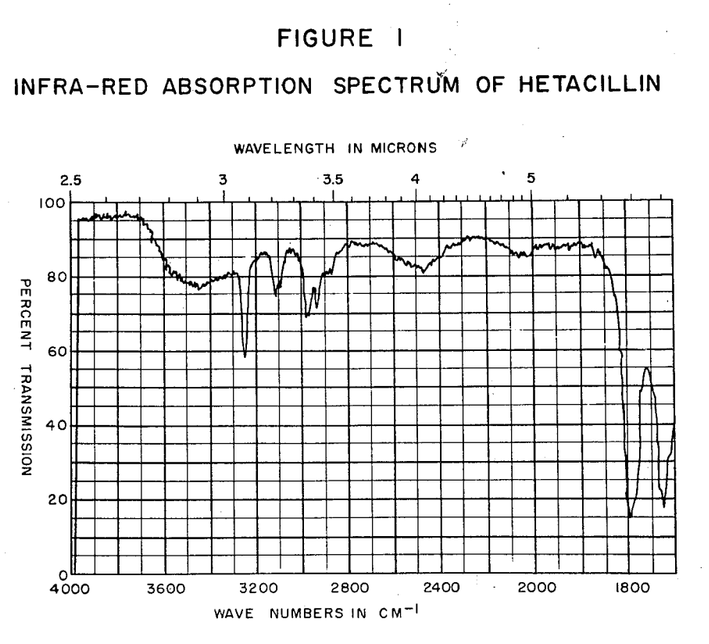
FIGURES 1 and 2 taken together are the infrared absorption spectrum of the product of the reaction at pH 7.5–9.5 of acetone and α-amino-2-thienylpenicillin when said reaction product is pelleted in potassium bromide.
Figure 2:
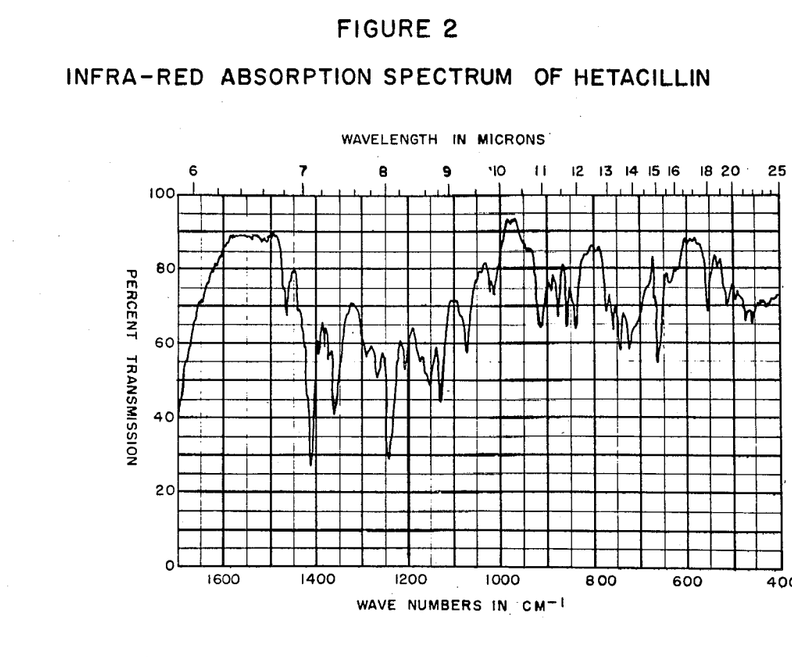
Figure 3:
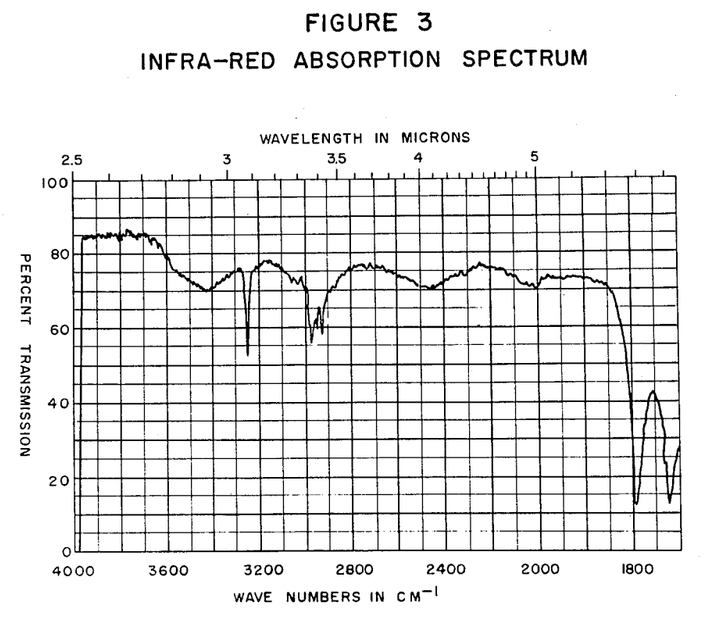
FIGURES 3 and 4 taken together are the infrared absorption spectrum of the product of the reaction at pH 7.5–9.5 of acetone and α-amino-2-thienylpenicillin when said reaction product is pelleted in potassium bromide.
Figure 4:
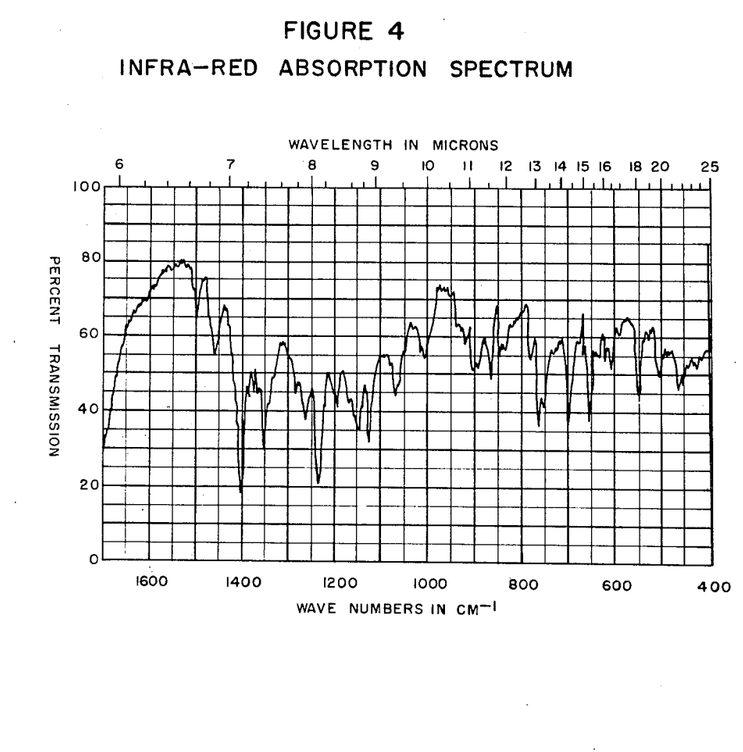

The infared absorption spectra were determined using a "Beckman IR9" spectrophotometer, slit width 1.0 frequency 970 cm.$^{-1}$, speed 200AI, period 2, gain 2.5×10.

The novel synthetic compounds of this invention are prepared by mixing (a) an α-aminopenicillin selected from the group consisting of the acids having the formula wherein R is as described above; and the salts thereof, and (b) a carbonyl compound selected from the group consisting of an aldehyde other than formaldehyde, cyclopentanone, cyclohexanone, cyclobutanone, cycloheptanone and methyl (lower) alkyl ketones at a pH within the range of from about 5.5 to about 9.5, and preferably at about pH 7.5 to 9.5.

The carbonyl compounds which can be used in the practice of this invention are those compounds having the formula in which $R^5$ may be hydrogen or methyl. When $R^5$ is methy, $R^6$ is (lower) alkyl. When $R^5$ is hydrogen, $R^6$ can be any group (except hydrogen) which can be attached to the carbonyl group of an aldehyde such as, e.g. aryl, arylalkyl, alkyl, etc. The groups $R^5$ and $R^6$ may be taken together to form a cycloalkanone containing 4 to 7 carbon atoms such as cyclobutanone, cyclopentanone, cyclohexanone and cycloheptanone.

The α-aminopenicillins used as intermediates in the practice of this invention may be prepared, as described in U.S Patents Nos. 2,985,648, 3,120,514 and 3,140,282 and Belgian Patent 631,631, by the reaction of 6-aminopincillanic acid with an acid chloride of the formula or wherein R has the meaning set forth above.

In the preparation of the preferred embodiments of this invention, the α-aminopencillin used is α-aminobenzylpenicillin of α-amino-2-thienylmethylpenicillin.

The α-carbon atom of the acyl group of the α-aminomethylpenicillins is an asymmetric carbon atom and the compounds can therefore exist in two optically active isomeric forms (the D- and L-diastereoisomers), as well as in a mixture of the two optically active forms.

In performing the reaction of (A) the recited α-aminopenicillin and (B) the recited carbonyl compound, the proportions of each reactant are not critical. Thus, some reaction will occur regardless of the proportions of reactants. It is preferred, however, in order to obtain maximum yields, to use a molar excess of the carbonyl compound. Large molar excesses of the carbonyl compound may be used and the carbonyl compound may comprise the reaction medium as well as a reactant if it is a liquid at the reaction temperature. If the carbonyl compound is a solid at the temperature of reaction, the reaction may be conducted in an inert solvent such as methylene chloride. The reaction medium may be anhydrous or aqueous. The reaction of the α-aminopenicillin and the carbonyl compound is an equilibrium reaction during which water is split off. Therefore, it is preferred not to have a major amount of water present in the reaction medium.

The pH of the reaction mixture during the formation of the novel penicillin derivatives should be from about 5.5 to about 9.5 and is preferably from about 7.5 to 9.0. The pH may be adjusted to within this range, if necessary, by the addition of an alkaline material such as, for example, sodium hydroxide, sodium carbonate, potassium hydroxide, potassium carbonate, ammonium hydroxide, ammonium carbonate, organic amines (e.g. triethylamine), etc.

The temperature during the reaction is not critical. The reaction will proceed satisfactorily at room temperature and may be hastened by heating.

After the α-aminopenicillin has reacted with the carbonyl compound, the resultant product may be recovered by evaporation of the liquid reaction medium. Thus, if the reaction medium is a liquid carbonyl compound, such as acetone, the α-aminopenicillin derivative product may be recovered by removing the acetone by evaporation.

In a preferred embodiment of this invention, the product is obtained by adding water to the reaction medium and quickly adjusting the pH of the mixture to within the range of from 1 to 3. The penicillin derivatives of this invention are insoluble in water at this pH and, therefore, they are precipitated from the aqueous mixture. Since the α-aminopenicillins per se are soluble in water at a pH of from 1 to 3, any unreacted α-aminopenicillin remains in solution. Thus, this procedure provides an excellent means for isolating the compounds of this invention.

The penicillin derivatives produced in accordance with the practice of this invention are much more water-insoluble and more stable in an acid environment than the corresponding α-aminopenicillins from which they are derived.

The derivative of α-aminobenzylpenicillin with acetone, which has the formula has been named hetacillin and may be prepared by mixing the sodium salt of α-aminobenzylpenicillin with dry acetone at 24–35° C. until a solution results (1–5 hours). The acetone solution is concentrated in vacuo to about ¼ volume and is added to a large volume of cold water. The pH is adjusted to 2.5–3.0 and a nicely crystalline white solid precipitates. The rectangular plates melt at 182.8–183.9° C. with decomposition (varies slightly depending on water content), are soluble in methanol and dimethylformamide, slightly soluble in acetone, and insoluble in water and most organic solvents. The infrared spectrum of the product contains absorption bands at 5.6μ (β-lactam), 5.8–5.9μ (carbon-oxygen or carbon-nitrogen double bond), and at 8.0μ (ether linkage). According to elemental analysis and Karl Fischer determinations, this compound has the empirical formula $C_{19}H_{23}N_3O_4S$. Calculated for $C_{19}H_{23}N_3O_4S$: C, 58.7; H, 5.97; N, 10.8; M.W., 389. Found: C, 58.8; H, 6.25; N, 10.65; M.W., 389, 393. The specific rotation in pH 7.0 buffer is +266°, and the isoelectric point, determined by electrophoresis, is 2.5. It does not react with 2,4-dinitrophenylhydrazine reagent in aqueous alcoholic, sulfuric acid at room temperature. Iodometric assays give results of 700–800 mcg./ml. and biological assays are in the 900–1000 mcg./mg. range versus α-aminobenzylpenicillin. When pelleted in potassium bromide this compound exhibited infrared absorption maxima at the following wave numbers in reciprocal centimeters: 3440 (broad), 3255, 2980, 2960, 2940, 2480 (broad), 1800, 1727, 1501, 1465, 1410, 1392, 1380, 1375, 1360, 1290, 1268, 1242, 1205, 1175, 1150, 1132, 1075, 1068 (shoulder), 1024, 1012, 926, 910, 900, 876, 855, 840, 790, 770, 760, 705, 660, 625, 612, 555, 510, 495, 470.

In another preferred embodiment of the present invention a concentrated solution of α-aminobenzylpenicillin in acetone-water (4:1) is adjusted to pH 7.5 and allowed to stand for 24 hours. The acetone is then extracted away with methyl isobutyl ketone and the separated aqueous phase is *immediately* acidified to pH 1–3. The acetone-α-aminobenzylpenicillin derivative then crystallizes out and is collected.

The following examples illustrate the best modes contemplated for carrying out this invention but it is not limited thereto.

Example 1

α-Aminobenzylpenicillin (8.4 g.; 0.023 mole) is dissolved in a mixture of water (100 ml.) and acetone (400 ml.) at a pH of 8.8 and at room temperature. This solution is then stirred at 36° C. for two hours during which time the pH drops to 7.9. The pH of the solution is adjusted to 7.0 and the acetone is removed in vacuo. The resultant pale yellow solution (100 ml.) is extracted with ether. The yellow color remains. The aqueous layer, which has a pH of 8.0, is filtered. The filtrate is then acidified by the addition of HCl. A cream-colored crystalline solid starts to separate at pH 4.5. This precipitate is still insoluble at pH 1.0. The pH is then adjusted to 2.0, the slurry is cooled for about one hour and filtered. The crystalline precipitate is washed with cold water and dried. The product (1.4 g.) is found to contain the β-lactam structure as shown by infrared analysis, to melt at 189.2–191.0° C. with decomposition, to be soluble in a pH 6.9 buffer, in methyl alcohol and in dimethylformamide and to be only slightly soluble in acetone. The product (the acetone derivative of α-aminobenzylpenicillin) is determined by bioassay to have an activity of 920 mcg./mg. versus α-aminobenzylpenicillin.

Example 2

The sodium salt of α-aminobenzylpenicillin (3.9 g.; 0.01 mole) is slurried in 200 ml. of acetone for 21 hours at room temperature. A turbid solution results after 16 hours. Water (50 ml.) is then added and the acetone is removed in vacuo. The resultant yellow aqueous solution is filtered and the filtrate is acidified with 20% HCl. At a pH of 4.0, an amorphous solid begins to separate which crystallizes upon scratching. The slurry is stirred cold at pH 2.9–3.0 for 1¾ hours. It is filtered, the product washed with cold water and dried. The product (1.4 g.) melts at 183.1–185.0° C. with decomposition and is found by bioassay to have an activity of 960 mcg./mg. and to contain the β-lactam structure as shown by infrared analysis. It inhibits *Staph. aureus* Smith at a concentration of 0.05 mcg./ml., *Diplococcus pneumoniae* at a concentration of 0.025 mcg./ml. and *Salmonella enteritidis* at a concentration of 0.4 mcg./ml., and, upon intramuscular injection in mice, exhibits versus *Staph. aureus* Smith a $CD_{50}$ of 3.8 mg./kg.

Example 3

The sodium salt of α-aminobenzylpenicillin (58.4 g.; 0.15 mole) is slurried at 35–40° C. for 19 hours in 750 ml. of acetone. The yellow color of the slurry appears to be slightly fluorescent. The composition is diluted with 250 ml. of water and the acetone is removed in vacuo. The remaining yellow aqueous portion (750 ml.) is filtered and the pH is adjusted from 8.5 to 3.0. During the pH adjustment, a white crystalline solid begins to form. The mixture is then diluted to a volume of 800 ml. with water. The resulting slurry is cooled in an ice bath and stirred for 1.0 hour. It is then filtered and the recovered precipitate is washed and dried in a vacuum oven at 50°. The product (16.5 g.) is found to melt at 184.0–189.0° C. with decomposition. This product is dissolved in 150 ml. of water at pH 8.0, the solution is filtered and the pH of the filtrate is adjusted to 3.0 by the addition of 70% HCl. A crystalline solid separates which is slurried with cold water, filtered, washed and dried. The product, which is the condensation product of acetone with α-aminobenzylpenicillin (8.3 g.), has a melting point of 184.7–186.0° C. with decomposition. Analysis for $C_{19}H_{23}N_3O_4S \cdot \frac{1}{2}H_2O$: Found: C, 57.2, 57.4; H, 5.80, 5.96. Calculated: C, 57.4%; H, 6.08%. The product inhibits *Staph. aureus* Smith at a concentration of 0.1 mcg./ml. The compound retained approximately 50% of its activity after 24 hours in an aqueous medium at a pH of 1.0. By contrast, α-aminobenzylpenicillin retained only 10% of its activity under the same conditions.

Example 4

The sodium salt of α-aminobenzylpenicillin (8.1 g; 0.0208 mole) is slurried in 160 ml. of isobutyraldehyde. The resultant solution is stirred for 22 hours. Subsequently, 100 ml. of water is added to the yellow solution. Two layers are thereby formed. The mixture is then concentrated in vacuo to a volume of 100 ml. Another 40 ml. of water is added and the volume is again concentrated to 100 ml. The small amount of yellow oil which has been formed remains on the bottom of the flask. The mixture is then filtered to separate the oil and the yellow aqueous filtrate is adjusted from a pH of 5.0 to 3.0. A semi-crystalline cream-colored solid separates and is slurried cold for a few minutes after which it is filtered, washed and dried. The product (1.4 g.) is found to have a melting point of 162.5–175.5° C. with decomposition. This product is then dissolved in about 15 ml. of water at a pH of 8.0 and the pH of the solution is readjustable to 3.0. A semicrystalline cream-colored solid separates. The mixture is stirred cold for a few minutes, filtered, washed and dried. The product (0.6 g.) is determined to have a melting point of 169.5–172.5° C. with decomposition. It is found by bioassay to have an activity of 175 mcg./mg. versus α-aminobenzylpenicillin and to contain the β-lactam structure as shown by infrared analysis. The product, the condensation product of α-aminobenzylpenicillin with isobutyraldehyde, has the molecular formula $C_{20}H_{25}N_3O_4S \cdot H_2O$. Analysis for this formula: Calculated: C, 57.1; H, 6.4; N, 9.98; S, 7.61; $H_2O$, 4.3. Found: C, 57.3; H, 6.12; N, 10.37; S, 7.57; $H_2O$, 3.8. The product inhibits *Staph. aureus* Smith at low concentrations.

Example 5

A slurry of α-aminobenzylpenicillin (36.7 g.; 0.1 mole) in 600 ml. of methylene chloride and 25 ml. of triethylamine is prepared whereby the triethylamine salt of α-aminobenzylpenicillin is formed. To this slurry there is added distilled benzaldehyde (10.6 g.; 10.1 ml.; 0.1 mole). The slurry becomes thicker and after 18½ hours a complete solution results. This solution is filtered and concentrated in vacuo to a yellow gum which is water- soluble. The gum is dissolved in two liters of cold water and the pH is adjusted to 2.9 to form a precipitate. This precipitate is collected and dissolved in water at a pH of 6.5. This aqueous solution is extracted with ether and the pH of the aqueous solution is adjusted to 3.0 whereby a crystalline solid precipitate is formed. The precipitate is collected by filtration, washed with water and dried. The product, the benzaldehyde derivative of α-aminobenzylpenicillin, is found to weigh 4.2 grams, to have a melting point of 168.3–171.6° C. with decomposition and is determined by bioassay to have an activity of 340 mcg./mg. versus α-aminobenzylpenicillin. Analysis for $C_{23}H_{23}N_3O_4S \cdot \frac{1}{2}H_2O$ (M.W. 446.5): Calc'd. C, 61.8; H, 5.41; $H_2O$, 2.0. Found: C, 61.4; H, 5.50; $H_2O$, 1.4.

*Example 6*

The sodium salt of α-aminobenzylpenicillin (37.1 g.; 0.1 mole) is slurried in 600 ml. of methylene chloride. Subsequently 10.4 ml. of cyclohexanone (0.1 mole) is added in one portion. Following this, 80 additional milliliters of cyclohexanone is added in incremental portions over a period of 24½ hours. The yellow slurry is added to two liters of cold water. This mixture is agitated, filtered and the filtrate emulsion is broken by centrifugation. The aqueous layer is adjusted to a pH of 2.5 and the crystalline solid which is thus formed is collected by filtration, washed with water and dried. The product, which is the condensation product of cyclohexanone and α-aminobenzylpenicillin, is determined to weigh 3.2 grams and to have a melting point of 185.4–187.1° C. with decomposition. The product is found by bioassay to have an activity of 440 mcg./mg. and to inhibit *Staph. aureus* Smith at low concentrations.

*Example 7*

Diazomethane is prepared by the dropwise addition of a 50% aqueous potassium hydroxide solution (6 ml.) to a cold stirred slurry of N-nitroso-N-methylurea (3.1 g.; 0.03 mole) in 60 ml. of ether. The resultant yellow solution is decanted into a cold slurry of the reaction product of acetone and α-aminobenzylpenicillin (which is obtained by the process of Example 3) (3.9 g.; 0.01 mole) in 160 ml. of ether and 40 ml. of methyl alcohol. Reaction is instantaneous and is accompanied by the evolution of $N_2$ gas. A complete solution results. About one-half of the ether solution of diazomethane is added before a permanent yellow color persists in the reaction vessel. Most of this yellow color is destroyed by the addition of acetic acid and the resulting solution is dried over $Na_2SO_4$. The filtrate is then concentrated in vacuo to a clear yellow gum which weighs 3.7 g. This is crystallized twice from a mixture of carbon tetrachloride and a petroleum distillate fraction consisting essentially of n-hexane and having a boiling point range of about 60–68° C. ("Skellysolve B") to give a white crystalline solid product (0.2 g.) which is soluble in organic solvents and melts at 101.5–102.0° C. (corrected). Its infrared spectrum indicated that it contains a β-lactam group. The product is the methyl ester of the acetone-α-aminobenzylpenicillin derivative and has an empirical formula of $C_{20}H_{25}O_4N_3S$ and the structural formula (as determined by X-ray diffraction analysis)

Analysis calculated for $C_{20}H_{25}O_4N_3S$: C, 59.54; H, 6.25; N, 10.42; S, 7.92; molecular weight 403.4. Found: C, 59.00; H, 6.03; N, 10.47; S, 8.05; molecular weight 402.

*Example 8*

In the process of Example 2, the α-aminobenzylpenicillin is replaced with an equivalent amount of each of the following penicillins:

Aminomethylpenicillin,
α-Aminopentylpenicillin,
α-Aminopropylpenicillin,
α-Aminoethylpenicillin,
α-Aminoisobutylpenicillin,
α-Amino-n-butylpenicillin,
α-Amino-α-methylbutylpenicillin,
α-Amino-β-methylbutylpenicillin,
α-Aminononylpenicillin,
α-Aminoundecylpenicillin,
α-Aminoheptadecylpenicillin,
α-Aminocyclohexylmethylpenicillin,
α-Amino-β-phenylethylpenicillin,
α-Amino-β-3-indolylethylpenicillin,
α-Amino-1-naphthylmethylpenicillin,
α-Amino-2-furylmethylpenicillin,
α-Thienyl-α-aminomethylpenicillin,
α-Amino-p-chlorobenzylpenicillin,
α-Amino-p-methoxybenzylpenicillin,
α-Amino-4-diethylaminobenzylpenicillin,
α-Amino-4-trifluoromethylbenzylpenicillin,
α-Amino-2,4-dibromobenzylpenicillin,
α-Amino-2-nitrobenzylpenicillin,
α-Amino-3-methylbenzylpenicillin,
α-Amino-4-sulfamylbenzylpenicillin,
α-Amino-2-iodobenzylpenicillin,
α-Amino-4-t-butylbenzylpenicillin, and
α-Amino-2-acetamidobenzylpenicillin.

The resultant products, the acetone derivatives of the respective penicillins, are stable at low pH's and inhibit *Staph. aureus* Smith.

*Example 9*

In the process of Example 3, the acetone is replaced with an equivalent amount of the following carbonyl compounds: cyclobutanone, cyclopentanone, methyl ethyl ketone, methyl butyl ketone, methyl pentyl ketone, acetaldehyde, chloral, glyoxal, propionaldehyde, butyraldehyde, valeraldehyde, isovaleraldehyde, furfural, acrolein, phenylacetaldehyde, α-tolualdehyde, β-tolualdehyde, dimethylbenzaldehyde, naphthaldehyde, malonaldehyde, succinaldehyde, terephthaldehyde, propargylaldehyde, β-chloropropionaldehyde, p-chlorobenzaldehyde, p-trifluoromethylbenzaldehyde, o-methoxybenzaldehyde, and 3,4-dimethoxybenzaldehyde. The resultant carbonyl derivatives of α-aminobenzylpenicillin are acid stable and inhibit *Staph. aureus* Smith.

*Example 10*

To 100 gm. of α-aminobenzylpenicillin slurried in 2500 ml. of acetone is added 200 ml. of a 22% solution of potassium ethylhexanoate in dry n-butanol and the mixture is warmed to 45° C. whereupon the acid dissolves. After the mixture is agitated for one hour at 40° to 45° C., the product begins to crystallize out. Agitation is continued for four hours at 45° C. after which the product, the potassium salt of hetacillin, is collected by filtration, washed with 500 ml. of dry acetone, dried for 17 hours at 40° C. and found to weigh 70.0 grams.

*Anal.*—Calc'd for $C_{19}H_{22}N_3SO_4K$: C, 53.4; H, 5.19; N, 9.83; K, 9.15. Found: C, 52.45; H, 5.12; N, 9.87; K, 7.95.

*Example 11*

α-Aminobenzylpenicillin trihydrate (270 gm.) is slurried in 1350 ml. of acetone. Triethylamine (189 ml.) is added to the slurry which is then heated to 40° C. whereupon the acid is dissolved. The solution is stirred for five hours at 40–45° C., polish-filtered through filter aid and then slowly poured into 1500 ml. of water at 5° C., the pH of the water being maintained at 2.5 by intermittent addition of 6 N hydrochloric acid. After addition of all the rich acetone solution to the ice water, the resulting slurry (containing a crystalline precipitate) is stirred for one hour in an ice bath. The product, hetacillin, is then collected by filtration, washed with 500 ml. of cold water, dried for 17 hours at 40° C. and found to weigh 127.4 gms.

*Example 12*

Sixty gms. of the hetacillin of Example 11 above is mixed in 1200 ml. of water at 20° C. To the resulting slurry is added 300 ml. of a 40% aqueous solution of β-naphthalene sulfonic acid. The slurry is stirred four hours at room temperature whereupon the product, the β-naphthalene sulfonic acid salt of hetacillin crystallizes out of solution as long needles, is collected by filtration, washed with 1200 ml. of cold water, dried for 20 hours at 40° C. and is found to weigh 76.5 grams.

*Anal.*—Calc'd for $C_{29}H_{31}N_3S_2O_7$: C, 58.30; H, 5.23; N, 7.03; S, 10.70. Found: C, 57.70; H, 5.69; N, 7.73; S, 9.74.

*Example 13*

*Part A.*—Three hundred grams of α-aminobenzylpenicillin trihydrate is mixed in 1500 ml. of acetone. Triethylamine (210 ml.) is added to the slurry which is then heated to and maintained at 30° C. for 20 hours. The solution is then polish-filtered through filter aid and the filter washed with 200 ml. acetone. The mixed filtrate and wash acetone is then added slowly to 1500 ml. ice water maintained at pH 2.5 by intermittent addition of 6 N hydrocholric acid. The resulting solution is stirred two hours at 0–10° C. while crystallization of hetacillin occurs. The crystalline product is then collected by filtration, washed on the filter with 600 ml. of ice water, dried and found to weigh 134.0 gms.

*Part B.*—120 gm. of the product of Part A above is slurried in 2200 ml. of water at 15° C. The slurry is agitated while 200 ml. concentrated hydrochloric acid is added and the solids dissolve. The strongly acidic solution is stirred for four hours at 27° C. during which time crystallization occurs. The crystalline product, the hydrochloric acid salt of heatcillin, is collected by filtration, quickly washed sequentially on the filter with 200 ml. of ice cold water and several portions of dry acetone, dried 18 hours at 40° C. and found to weigh 75 gms.

*Anal.*—Calc'd for $C_{19}H_{24}N_3SO_4Cl$: C, 53.8; H, 5.70; N, 9.89; Cl, 8.13. Found: C, 53.80; H, 5.78; N, 10.08; Cl, 8.25.

*Example 14*

*Part A: Preparation of starting materials*—1. α-(2-thienyl)hydantoin.—Sodium cyanide (875 grams; 17.84 moles) and ammonium carbonate (4050 grams; 41.8 moles) are dissolved in 12 liters of distilled water. To this solution there is added a solution of 1000 grams (8.92 moles) of α-thiophenealdehyde in 12 liters of methanol. The addition and subsequent reaction are carried out under a blanket of nitrogen to prevent oxidation of the aldehyde. The mixture is heated to 50–55° C. with stirring for four hours, during which time it changes in color from white to deep yellow. The reaction mixture is cooled to room temperature and filtered, and the solid is washed with two one-liter portions of methanol.

The combined filtrate and washes are concentrated under reduced pressure to approximately one third their original volume. The pH of the solution is slowly adjusted to 2.0 with concentrated hydrochloric acid, taking the necessary precautions for disposal of the large amount of liberated HCN. The solution is heated to 95–100° C. for ten minutes and 200 grams of decolorizing carbon is added. The solution is heated for another five minutes and filtered. The carbon cake is washed with 500 ml. of water and the combined filtrate and wash is cooled in an ice bath for one hour to yield a light yellow crystalline precipitate, which is collected by filtration and washed with a small amount of water. The product, α-(2-thienyl)hydantoin, is found to weigh about 950 gms., after drying.

2. *DL-α-Amino-2-thienylacetic acid.*—α-(2-thienyl)hydantoin (1000 grams; 5.5 moles) is added to 4000 ml. of 20% aqueous sodium hydroxide solution and the mixture is refluxed for 17 hours. Fifty grams of decolorizing carbon is added and the mixture is stirred for about five minutes. The hot reaction solution is filtered, and the filter cake is washed with one displacement of water. The combined filtrate and wash is cooled and slowly acidified with glacial acetic acid to a pH of 7.0. The resulting slurry is cooled to 15–20° C., filtered and the filter cake is washed with one liter of cold water. The filter cake is suspended in two liters of distilled water and sufficient concentrated hydrochloric acid is added to dissolve the crude product (the resulting pH is approximately 1.0). A small amount of tarry material is found to be insoluble. Fifty grams of decolorizing carbon is added, the mixture is stirred for five minutes and filtered hot. The filter cake is washed with 200 ml. of water and the combined filtrate and wash is adjusted to pH 4.5 with $NH_4OH$ and chilled in an ice bath for one hour. The resulting slurry is filtered and washed with 250 ml. of iced water. The solid product, DL-α-amino-2-thienylacetic acid, is dried at 45–50° C.

3. *(-)-α-Amino-2-thienylacetic acid.*—d-10-camphorsulfonic acid (1620 grams; 7.0 moles) is dissolved in 9.7 liters of isopropanol at 60° C. This solution is heated to just below its boiling point and 1000 grams (6.36 moles) of DL-α-amino-2-thienylacetic acid is added with stirring. The mixture is heated at the boiling point for a few minutes to obtain essentially complete solution and filtered hot through a heated filter. The filtered solution is stirred slowly and cooled to room temperature over a period of six hours. It is allowed to remain at room temperature for an additional 10 hours to complete the crystallization. The crystalline solid is recovered by filtration, washed with three liters of isopropanol and dried at 45–50° C. The product, the d-10-camphorsulfonic acid salt of (-)-α-amino-2-thienylacetic acid, is found to weigh 850 grams.

One thousand grams of the d-10-camphorsulfonic acid salt of α-amino-2-thienylacetic acid is slurried in three liters of distilled water and the pH of the slurry is adjusted to 5.5 by the slow addition of $NH_4OH$. After the pH has been adjusted to 5.5, an additional two liters of methanol is added to the slurry, and the slurry is stirred for an additional 20-minute period. The pH is readjusted as necessary to maintain it at 5.5. The slurry is cooled to 0° C. for one hour, filtered and the filter cake is washed with one liter of cold methanol-water solution (two parts methanol to one part water) and with three liters of methanol. The solid product, (-)-α-amino-2-thienylacetic acid is dried at 45–50° C. and is found to weigh about 330 grams. It melts with decomposition at 189–191° C. and has an optical rotation of $[\alpha]_D^{23} = -73.7°$ C. (concentration equals 1.0% in water).

4. *(-)-α-Amino-2-thienylacetyl chloride hydrochloride.*—Dry hydrogen chloride gas is bubbled into a suspension of 17 grams (0.108 mole) of (-)-α-amino-2-thienylacetic acid in 200 ml. of methylene dichloride for a period of eight minutes at room temperature. The suspension is cooled to −10° C. with stirring and 29 grams (0.141 mole) of $PCl_5$ are added. Stirring is continued for three hours at a temperature of −8 to −5° C. and for an additional three hours at 0–2° C. The suspension is filtered and the solid material is washed with a small portion of methylene dichloride and dried in vacuo over $P_2O_5$. The product, (-)-α-amino-2-thienylacetyl chloride hydrochloride is found to weigh 21.2 grams.

*Part B: Preparation of (-)-α-Amino-2-thienylmethylpenicillin.*—6-aminopenicillanic acid (23.8 grams; 0.11 mole) is dissolved in 275 ml. of iced water by the addition of dilute NaOH to a pH of 7.2. To this solution (a total of 320 ml.) there is added 1280 ml. of cold acetone. The solution is cooled to 0° C., and the pH is adjusted to 3.5 with hydrochloric acid. To the stirred solution there is added 21.2 grams (0.1 mole) of (-)-α-amino-2-thienylacetyl chloride hydrochloride over a period of 20 minutes. The pH is maintained between 2.5 and 3.0 during the reaction by the periodic addition of dilute NaOH. At the end of the 20-minute reaction time, the temperature has risen to 5° C. The pH is adjusted to 2.9, and stirring is continued for an additional fifteen minutes. Methyl isobutyl ketone (2560 ml.) is added and, after thorough mixing, the aqueous layer is separated. The methyl isobutyl ketone layer is extracted with a second 200 ml. portion of water and with a third 100 ml. portion of water. The combined aqueous layers are adjusted to pH 4.7, 250 ml. of methyl isobutyl ketone is added, and the mixture is concentrated under vacuum to approximately 350 ml., at which time a crystalline solid forms. The mixture is filtered, and the solid material is washed with small portions of water and methyl isobutyl ketone and dried in vacuo over $P_2O_5$. The resulting product, (-)-α-amino-2-thienylmethylpenicillin trihydrate, is found to weigh 10.7 grams and to inhibit the growth of *Staph. aureus* Smith.

*Part C: Preparation of condensation product of acetone and (-)-α-Amino-2-thienylmethylpenicillin*

(-)-α-Amino-2-thienylmethylpenicillin (2 g., chem. assay 780 mcg./mgm. versus ampicillin) was slurried in 20 ml. acetone and 1.5 ml. triethylamine was added. The mixture was stirred 16 hours at 25° C. The suspension was filtered, the solid was washed with 5 ml. acetone and the combined acetone-wash and filtrate was added slowly to 25 ml. cold water (5–10° C.) maintained at pH 2.5–3.0 with 6 N HCl. The mixture was then stirred three hours in the ice bath as the product, the condensation product of acetone and (-)-α-amino-2-thienylmethylpenicillin, precipitated and was collected by filtration, washed with 25 ml. cold water and then with dry acetone, dried 20 hours at 45° C. and found to weigh 0.38 g., to have a specific rotation of +307° in 1% solution in dimethylformamide, to give a chemical assay of 900 mcg./mgm. versus ampicillin and a bioassay of 980 mcg./mgm. versus α-amino-2-thienylmethylpenicillin, to darken on heating at 165–170° C. and to melt with decomposition at 195–200° C. and to have an isoelectric point of 2.5 determined by electrophoresis.

*Analysis.*—Calc'd for $C_{17}H_{21}N_3S_2O_4$: C, 51.7; H, 5.37; N, 10.63; S, 16.20. Found: C, 50.65; H, 5.48; N, 10.75; S, 16.5.

When pelleted in potassium bromide this compound exhibited infrared absorption maxima at the following wave numbers in reciprocal centimeters: 3440 (broad), 3250, 3110, 3100, 2980, 2970, 2940, 2470 (broad), 1800, 1730, 1465, 1410, 1395, 1382, 1373, 1360, 1290, 1270, 1243, 1210, 1175, 1155, 1135, 1076, 1024, 1012, 913, 892, 877, 860, 840, 771, 760, 742, 722, 660, 554, 510, 493.

*Comparison of microbiological properties of hetacillin and ampicillin*

*Antibacterial spectrum.* — The minimum inhibitory concentrations of hetacillin and ampicillin were determined for a variety of organisms. The determinations were run in Heart Infusion Broth (Difco) plain or diluted 1:1 with pooled human serum. Overnight cultures were used at $10^4$ dilution and the antibiotics were diluted in a series of two fold steps. The results are reported in Table I.

TABLE I

| | Minimum Inhibitory Concentration, mcg./ml. | |
|---|---|---|
| | Hetacillin | Ampicillin |
| *Diplococcus pneumoniae* | 0.016 | 0.016 |
| *Streptococcus pyogenes* | 0.016 | 0.008 |
| *Staphylococcus aureus* Smith | 0.031 | 0.031 |
| *Staphylococcus aureus* Smith | 0.062 | 0.031 |
| *Staphylococcus aureus* 1633-2 | >100 | >100 |
| *Staphylococcus aureus* 1633-2 | >50 | >50 |
| *Staphylococcus aureus* 52-75 | >100 | >100 |
| *Escherichia coli* ATCC No. 8739 | 6.25 | 6.25 |
| *Salmonella enteritidis* | 0.25 | 0.25 |
| *Salmonella typhosa* | 1.6 | 1.6 |
| *Klebsiella pneumoniae* | 3.1 | 3.1 |
| *Mycobacterium smegmatis* No. 607 | >100 | >100 |
| *Pseudomonas aeruginosa* | >100 | >100 |

*Mouse protection test.*—Mice were challenged intraperitoneally with *Staphylococcus aureus* Smith, *Salmonella enteritidis* and *Klebsiella pneumoniae*. The antibiotics were administered intramuscularly in a leg or orally. The results are given in Table II.

TABLE II

*Mouse protection test*

| Challenge Organism | Route of Administration | Acute $CD_{50}$ mg./kg. | |
|---|---|---|---|
| | | Hetacillin | Ampicillin |
| *Staph. aureus* Smith | Im | 0.76 | 0.64 |
| *Staph. aureus* Smith | Oral | 0.86 | 0.76 |
| *Salmonella enteritidis* | Im | 3.2 | 1.8 |
| *Salmonella enteritidis* | Oral | 9.0 | 38.0 |
| *Klebsiella pneumoniae* | Im | 230.0 | 130 |
| *Klebsiella pneumoniae* | Oral | 45 | 62 |

We claim:
1. A member selected from the group consisting of an amphoteric antibacterial compound and the nontoxic pharmaceutically acceptable salts thereof; said amphoteric antibacterial compound being prepared by the process which comprises mixing
  (a) an aminopenicillin selected from the group consisting of the acids of the formula wherein R is a member selected from the group consisting of hydrogen, alkyl, cycloalkyl, indolylalkyl, naphthyl, benzyl, furyl and radicals having the formulae and wherein $R^1$, $R^2$ and $R^3$ are each a member selected from the group consisting of hydrogen, nitro, di(lower)alkylamino, (lower)alkanoylamino, (lower)alkanoyloxy, (lower)alkyl, (lower)alkoxy, sulfamyl, chloro, iodo, bromo, fluoro and trifluoromethyl and salts thereof with at least an equimolar weight of
  (b) a carbonyl compound selected from the group consisting of cyclobutanone, cyclopentanone, cyclohexanone, cycloheptanone, and aldehydes of the formula $R^7CHO$ wherein $R^7$ is a member selected from the group consisting of (lower)alkyl and the radicals of the formula wherein $R^1$, $R^2$ and $R^3$ have the meaning set forth above and $n$ is an integer from 0 to 6 inclusive
   (c) at a pH within the range of about pH 5.5 to about pH 9.5.
2. An amphoteric antibacterial compound which is prepared by the process which comprises mixing
   (a) the penicillin of the formula with at least an equimolar weight of
   (b) a cycloalkanone containing 4 to 7 carbon atoms inclusive
   (c) at a pH of about 7.5 to 9.5; and
   (d) recovering the amphoteric antibacterial compound so produced.
3. An amphoteric antibacterial compound which is prepared by the process which comprises mixing
   (a) a penicillin of the formula with at least an equimolar weight of
   (b) a cycloalkanone containing 4 to 7 carbon atoms inclusive
   (c) at a pH of about 7.5 to 9.5; and
   (d) recovering the amphoteric antibacterial compound so produced.
4. An amphoteric antibacterial compound which is prepared by the process which comprises mixing
   (a) the penicillin of the formula with at least an equimolar weight of
   (b) an aldehyde of the formula Alk—CHO wherein Alk represents (lower)alkyl
   (c) at a pH of about 7.5 to 9.5; and
   (d) recovering the amphoteric antibacterial compound so produced.
5. A member selected from the group consisting of the amphoteric compounds of the formula wherein R is a member selected from the group consisting of hydrogen, alkyl, cycloalkyl, indolylalkyl, naphthyl, benzyl, furyl and radicals having the formulae and wherein $R^1$, $R^2$ and $R^3$ are each a member selected from the group consisting of hydrogen, nitro, di(lower)alkylamino, (lower)alkanoylamino, (lower)alkanoyloxy, (lower)alkyl, (lower)alkoxy, sulfamyl, chloro, iodo, bromo, fluoro and trifluoromethyl and Alk represents (lower)alkyl; and the nontoxic, pharmaceutically acceptable salts thereof.
6. The compound of the formula

7. The compound of the formula

8. The process for the production of an amphoteric antibacterial agent which comprises mixing
   (a) an aminomethylpenicillin selected from the group consisting of acids having the formula wherein R is a member selected from the group consisting of hydrogen, alkyl, cycloalkyl, indolylalkyl, naphthyl, benzyl, furyl, a radical having the formula and a radical having the formula wherein $R^1$, $R^2$ and $R^3$ each represent a member selected from the group consisting of hydrogen, nitro, di(lower)-alkylamino, (lower)alkanoylamino, (lower)alkanoyloxy, (lower)alkyl, (lower)alkoxy, sulfamyl, chloro, iodo, bromo, fluoro and trifluoromethyl and the salts thereof; with at least an equimolar weight of
   (b) a carbonyl compound selected from the group consisting of cyclobutanone, cyclopentanone, cyclohexanone, cycloheptanone and methyl(lower)alkyl ketones and aldehydes of the formula $R^7$CHO wherein $R^7$ is a member selected from the group consisting of (lower)alkyl and radicals of the formula wherein $R^1$, $R^2$ and $R^3$ are as defined above and $n$ is an integer from 0 to 6 inclusive;

(c) at a pH within the range of about pH 7.5 to about pH 9.5; and
(d) recovering the amphoteric compound so produced.

9. An antibacterial compound which is prepared by the process which comprises mixing
  (a) the penicillin of the formula with at least an equimolar weight of
  (b) benzaldehyde
  (c) at a pH of about 7.5 to 9.5; and
  (d) recovering the antibacterial compound so-produced.

10. The compound of the formula

References Cited by the Applicant

UNITED STATES PATENTS 2,985,648   5/61   Doyle et al.

OTHER REFERENCES

Davis et al.: J. Chem. Soc., 1951, 3479–3489.

NICHOLAS S. RIZZO, *Primary Examiner.*